(12) United States Patent
Celik

(10) Patent No.: US 12,372,411 B2
(45) Date of Patent: Jul. 29, 2025

(54) MICROBOLOMETER DETECTOR WITH ADJUSTABLE SPECTRAL REACTIVITY

(71) Applicant: ASELSAN ELEKTRONIK SANAYI VE TICARET ANONIM SIRKETI, Ankara (TR)

(72) Inventor: Ozer Celik, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 18/550,981

(22) PCT Filed: Oct. 11, 2022

(86) PCT No.: PCT/TR2022/051116
§ 371 (c)(1),
(2) Date: Sep. 18, 2023

(87) PCT Pub. No.: WO2023/063913
PCT Pub. Date: Apr. 20, 2023

(65) Prior Publication Data
US 2024/0192058 A1   Jun. 13, 2024

(30) Foreign Application Priority Data

Oct. 14, 2021 (TR) ............... 2021/016033

(51) Int. Cl.
*G01J 5/02* (2022.01)
*G01J 5/08* (2022.01)
*G01J 5/20* (2006.01)

(52) U.S. Cl.
CPC ............ *G01J 5/0853* (2013.01); *G01J 5/023* (2013.01); *G01J 5/084* (2013.01); *G01J 5/20* (2013.01)

(58) Field of Classification Search
CPC .......... G01J 5/023; G01J 5/084; G01J 5/0853; G01J 5/20
See application file for complete search history.

(56) References Cited

U.S. PATENT DOCUMENTS

| 7,262,413 B2 | 8/2007 | Kauffman |
| 2003/0168599 A1 | 9/2003 | Liddiard |
| 2011/0240860 A1 | 10/2011 | Talghader |
| 2020/0025619 A1 | 1/2020 | Almasri et al. |

FOREIGN PATENT DOCUMENTS

| CN | 105737993 B | * | 4/2019 | ............... G01J 5/20 |
| WO | WO-2011078064 A1 | * | 6/2011 | ............... H03B 7/08 |
| WO | WO-2019043299 A1 | * | 3/2019 | ........... B81B 7/0067 |

OTHER PUBLICATIONS

English translation of CN105737993 (Year: 2016).*

* cited by examiner

*Primary Examiner* — Mark R Gaworecki
(74) *Attorney, Agent, or Firm* — Bayramoglu Law Offices LLC

(57) ABSTRACT

A microbolometer detector with adjustable spectral reactivity includes a reflective element between a suspended pixel body and a base section, a bimetallic arm, one end of which is connected to one end of the reflective element and the other end to the base section via the electrode connection, the temperature of which is increased by passing current, and changes the height of the reflective element by expanding with the increase in temperature.

2 Claims, 2 Drawing Sheets

MICROBOLOMETER DETECTOR WITH ADJUSTABLE SPECTRAL REACTIVITY

CROSS REFERENCE TO THE RELATED APPLICATIONS

This application is the national phase entry of International Application No. PCT/TR2022/051116, filed on Oct. 11, 2022, which is based upon and claims priority to Turkish Patent Application No. 2021/016033, filed on Oct. 14, 2021, the entire contents of which are incorporated herein by reference.

TECHNICAL FIELD

The present invention relates to a microbolometer detector with adjustable spectral reactivity. In particular, the present invention relates to a microbolometer detector with adjustable spectral responsiveness with the help of the bimetallic arms and the movable reflective metal layer, without reducing the mechanical strength of the pixel body.

BACKGROUND

A microbolometer is a special type of bolometer used as a detector in a thermal imager. Infrared radiation with wavelengths between 7.5-14 μm is absorbed by the detector material and heated. Thus, it changes the electrical resistance. This resistance change is measured, and the signals are processed to create an image. Unlike other types of infrared sensing equipment, microbolometers do not require cooling.

In the state of the art, it is possible to detect in various bands by producing microbolometer pixel structures with different spectral reactivity. Detector structures with larger surface area are used in this method since the first of these methods requires the microfabrication of two different types of pixel structures. This will lead to complex designs in reading circuit electronics. In another method, spectral selectivity can be adjusted by using moving pixel bodies. However, this method can create negative situations in terms of mechanical strength.

As a result of the research made in the state of the art, document numbered U.S. Pat. No. 7,262,413B2 is encountered. The application relates to a photoconductive bolometer infrared detector using detector material whose resistance changes due to photo-excitation and thermal-excitation from incoming radiation in the infrared range. However, the application does not mention a microbolometer detector with adjustable spectral reactivity with the help of the moving reflective metal layer.

As a result, due to the abovementioned disadvantages and the insufficiency of the current solutions regarding the subject matter, a development is required to be made in the relevant technical field.

SUMMARY

The invention aims to solve the abovementioned disadvantages by being inspired from the current conditions.

The main aim of the invention is to enable the distance between the pixel body and the reflection layer to be changed in a controlled manner with the help of the moving metal layer. Thus, the reactivity value will be adjusted to maximum.

In order to fulfil the above mentioned aims, the present invention relates to a microbolometer detector with adjustable spectral reactivity, comprising of a reflective element, located between a suspended pixel body and a base section, a bimetallic arm, one end of which is connected to one end of the reflective element and the other end to the base via the electrode connection, the temperature of which is increased by passing current, and changes the height of the reflective element by expanding with the increase in temperature.

DESCRIPTION OF THE PART REFERENCES

Figure 1:
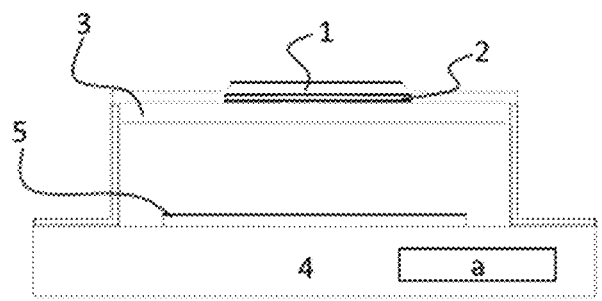
FIG. 1 is a view of the microbolometer pixel structure in the prior art.

1. Absorber section
2. Active material
3. Pixel body
4. Base section
   a. Reading circuit
5. Reflective element
6. Bimetallic arm
7. Electrode connection

DETAILED DESCRIPTION OF THE EMBODIMENTS

In this detailed description, the preferred embodiments of the invention are described only for clarifying the subject matter in a manner such that no limiting effect is created.

Microbolometer detectors are thermally insulated detector structures through conduction arms from the base. FIG. 1 shows the basic structure of the microbolometer pixel. Accordingly, the base section (4) consists of the reading circuit (a) made of silicon; the upper part consists of the absorber section (1), the active material (2) and the pixel body (3), respectively.

Infrared radiation coming on the detector is absorbed by the microbolometer pixel structure and increases the temperature of the pixel body (3). This increase in temperature causes the resistance structure defined as the active material (2) to heat up and changes the resistance value of the active material. This change in resistance is converted into an electrical signal and detected with the help of the reading circuit (a) and an infrared image is obtained.

The spectral reactivity of microbolometer detectors is determined by the distance between the suspended pixel body (3) and the metal reflective element (5) attached to the base section (4). This distance is used to determine the region where the spectral reactivity of the detector will be maximum, similar to the operating principle of Fabry-Perot resonators. For the case where the wavelength is 10 μm, this distance corresponds to the distance of 2.5 μm using the λ\4 method. This distance can be adjusted and the region where the spectral reactivity will be maximum can be changed with the help of the present invention.

Figure 2:
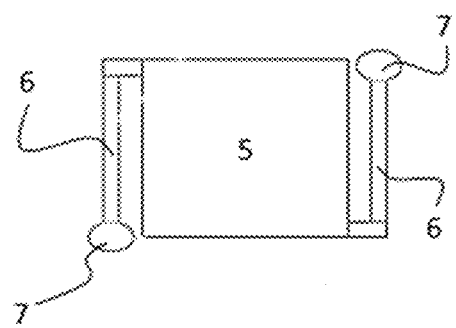
FIG. 2 is a view of the reflective element.

The distance between the pixel body (3) and the base part (4) can be changed in a controlled manner by means of the reflective element (5) in the present invention. As seen in FIG. 2, the height of the reflective element (5) can be adjusted by means of the bimetallic arm (6) connected to both ends. One end of the bimetallic arm (6) is connected to one end of the reflective element (5) and the other end is connected to the base section (4) via the electrode connection (7). Thus, the region where the reactivity value will be maximum can be adjusted by changing the distance between the pixel body (3) and the reflective element (5) in a controlled manner.

Figure 3:
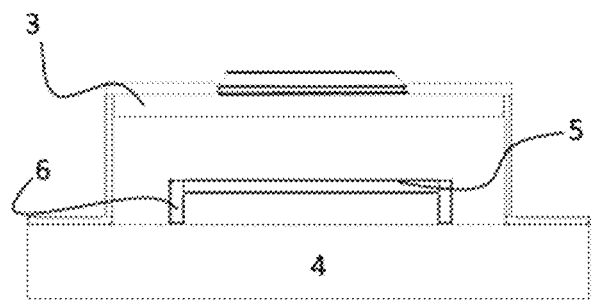
FIG. 3 is a view of the inventive moving reflector element and the microbolometer detector.
Figure 4:
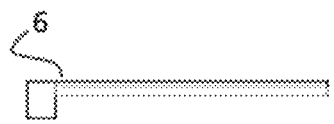
FIG. 4 is a view of the bimetallic arm.

As seen in FIG. 3, the bimetallic arm (6) is bent and the reflective element (5) is brought closer to the pixel body (3), causing the resonator structure to shift to smaller wavelengths with the increase in temperature.

Figure 5:
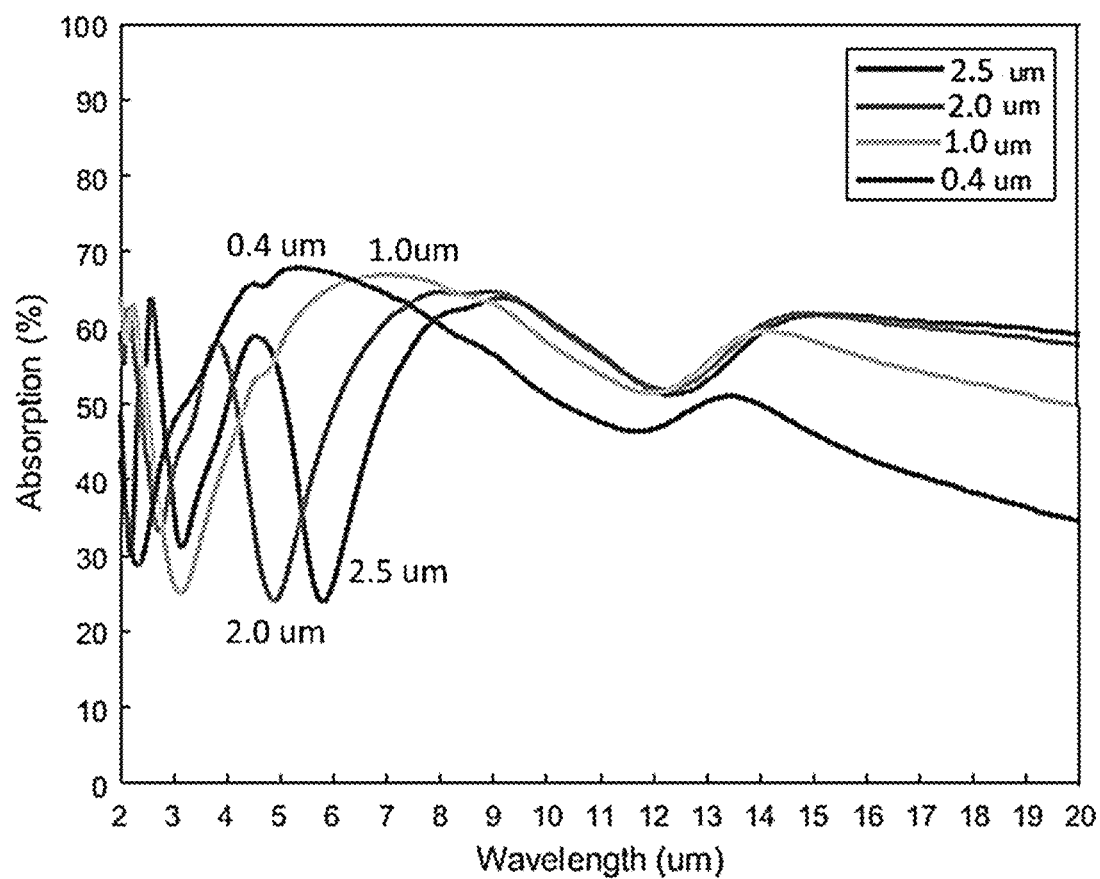
FIG. 5 is a graph of the variation of spectral reactivity with the distance between the pixel body and the reflective metal.

The simulation results of the reactivity change depending on the distance between the pixel body (3) and the reflective element (5) are given in FIG. 5.

In order to increase the temperature of the bimetallic arm (6), current is passed over it. Joule heat is created on the structure and thus the temperature of the bimetallic arm (6) is increased in a controlled manner with the applied current. The reflective element (5) moves with the help of the metal/metal alloy structures with different expansion coefficients in the bimetallic arm (6) with the increase in temperature. This allows the spectral reactivity to be adjusted by controlling the distance of the reflective element (5) from the pixel body (3) depending on the applied current.

What is claimed is:

1. A microbolometer detector with an adjustable spectral reactivity, comprising:
    a reflective element, wherein the reflective element is located between a suspended pixel body and a base section,
    a bimetallic arm, wherein a first end of the bimetallic arm is connected to one end of the reflective element and a second end of the bimetallic arm is connected to the base section via an electrode connection, the bimetallic arm changes a height of the reflective element by expanding with an increase in temperature, the temperature of the bimetallic arm is increased by a passing current through the bimetallic arm.

2. The microbolometer detector according to claim 1, further comprising a bimetallic arm containing metal/metal alloy structures with different expansion coefficients.

* * * * *